United States Patent
Hasinovic et al.

(10) Patent No.: US 7,381,249 B2
(45) Date of Patent: Jun. 3, 2008

(54) WAX COMPOSITION FOR APPLICATION TO WET SURFACES

(75) Inventors: Hida Hasinovic, Lexington, KY (US); Elsie A. Jordan, Temecula, CA (US)

(73) Assignee: Ashland Licensing and Intellectual Property, LLC (ALIP), Lexington, KY (US)

( * ) Notice: Subject to any disclaimer, the term of this patent is extended or adjusted under 35 U.S.C. 154(b) by 135 days.

(21) Appl. No.: 11/450,715

(22) Filed: Jun. 9, 2006

(65) Prior Publication Data

US 2007/0251417 A1    Nov. 1, 2007

Related U.S. Application Data

(60) Provisional application No. 60/810,986, filed on Jun. 5, 2006, provisional application No. 60/795,890, filed on Apr. 28, 2006.

(51) Int. Cl.
- *C09G 1/08* (2006.01)
- *C09G 1/02* (2006.01)
- *C09G 1/12* (2006.01)
- *C09D 183/00* (2006.01)
- *C09D 191/06* (2006.01)
- *C09K 3/00* (2006.01)
- *C09K 3/18* (2006.01)
- *B05D 3/00* (2006.01)
- *B05D 5/00* (2006.01)
- *B05D 5/08* (2006.01)

(52) U.S. Cl. .............. 106/10; 106/3; 106/11; 106/271; 106/272; 134/42; 427/299; 427/331; 427/355; 427/387; 427/416; 427/421.1; 427/427.4; 516/55; 516/77

(58) Field of Classification Search ............ 106/3, 106/10, 11, 271, 272; 134/42; 427/299, 427/331, 355, 387, 416, 421.1, 427.4; 516/55, 516/77

See application file for complete search history.

(56) References Cited

U.S. PATENT DOCUMENTS

| | | | |
|---|---|---|---|
| 2,907,664 A * | 10/1959 | Schoenholz et al. ......... 106/10 |
| 3,554,949 A * | 1/1971 | Burke, Jr. ................. 524/504 |
| 4,348,292 A | 9/1982 | Ginn |
| 4,690,779 A | 9/1987 | Baker et al. |
| 5,726,139 A | 3/1998 | Willey et al. |
| 5,759,980 A | 6/1998 | Russo et al. |
| 5,763,379 A | 6/1998 | Janota |
| 5,854,169 A | 12/1998 | Heller et al. |
| 5,866,532 A | 2/1999 | Jackson et al. |
| 5,871,590 A | 2/1999 | Hei et al. |
| 5,945,474 A | 8/1999 | Gaultier |
| 6,090,767 A | 7/2000 | Jackson et al. |
| 6,333,299 B1 | 12/2001 | Pace et al. |
| 6,484,735 B1 | 11/2002 | Gordon et al. |
| 6,551,985 B1 | 4/2003 | Bianchetti et al. |
| 6,562,114 B1 | 5/2003 | Yeiser et al. |
| 6,562,142 B2 | 5/2003 | Barger et al. |
| 6,602,835 B2 | 8/2003 | Schmeida et al. |
| 6,669,763 B1 | 12/2003 | Ghodoussi |
| 6,685,765 B1 | 2/2004 | Ghodoussi |
| 6,718,992 B1 | 4/2004 | Cardola et al. |
| 6,953,500 B2 | 10/2005 | Lewis |
| 6,992,051 B2 | 1/2006 | Anderson |
| 2003/0220221 A1 | 11/2003 | McDonald et al. |
| 2004/0110850 A1 | 6/2004 | Jordan et al. |
| 2005/0153077 A1 | 7/2005 | Gedeon et al. |
| 2005/0155515 A1* | 7/2005 | Jordan et al. .................. 106/10 |
| 2005/0239675 A1 | 10/2005 | Makansi |
| 2007/0129275 A1* | 6/2007 | Hasinovic et al. .......... 510/189 |
| 2007/0163463 A1* | 7/2007 | Hasinovic et al. ............ 106/10 |
| 2007/0163464 A1* | 7/2007 | Hasinovic et al. ............ 106/10 |
| 2007/0209549 A1* | 9/2007 | Hasinovic et al. ............ 106/11 |
| 2007/0298992 A1* | 12/2007 | Hasinovic et al. .......... 510/189 |

* cited by examiner

*Primary Examiner*—Anthony J Green
(74) *Attorney, Agent, or Firm*—Carrithers Law Office PLLC; David W. Carrithers

(57) ABSTRACT

A wax composition for application to a wet surfaces utilizing a polymeric emulsion with a cross-linked copolymer of acrylic acid and C10-30 alkyl acrylate whereby upon application to the surface to be waxed the hydrophilic portion of the polymer instantly collapses releasing the oil phase and providing immediate coverage of the application surface forming a film upon drying, and buffing the waxed surface with an absorbent material leaves a protective coating of wax of the surface which does not easily re-emulsify or wash off when further exposed to water.

14 Claims, No Drawings

WAX COMPOSITION FOR APPLICATION TO WET SURFACES

This application claims priority from U.S. provisional application Ser. No. 60/795,890 filed on Apr. 28, 2006 and U.S. provisional application Ser. No. 60/810,986 filed on Jun. 5, 2006, both of which are incorporated herein by reference.

BACKGROUND OF THE INVENTION

1. Technical Field

This invention relates to a high water content silicone wax composition that protects and provides a high gloss on automobile exterior surfaces and is applied to a clean water wet surface.

2. Description of the Prior Art

There are numerous wax products available on the market to protect and polish the painted body surfaces of an automobile and also various different ways of applying the same. The most recommended procedure is to wash and dry the painted surface, apply the protective finish to the clean dry surface, and then buff the surface. The applied wax remains as a protective finish.

A quick wax job is obtainable in an automatic or semi-automatic car-wash where a detergent is applied to the surface of the vehicle under high water pressure and/or using a water and detergent solution together with strips of absorbent material or sponges to remove the dirt. As part of the car-wash liquid wax may be sprayed onto the vehicle and allowed to drip dry or be dried using an air blower. The wax compositions used by professional car washes that are applied while the automobile painted surface is wet are immediately subjected to a blow dry step and is not buffed. Neither of the latter two wax compositions and procedures of applying the same provide long lasting satisfactory results.

Conventional commercial waxes and polishes typically contain a wax dispersed in water or dissolved in a solvent often together with abrasives for dry application to a painted surface of a automobile. The wax dries and is removed with hand or mechanical buffing machines requiring considerable labor and time.

Two references considered of interest with respect to applicants wax composition are U.S. Pat. No. 6,103,323 issued in January of 2000 to D. W. Klayder et al which teaches silicone gel waxes and protectants; and U.S. Pat. No. 5,700,312 issued in December of 1997 to R. L. Fausnight et al. which teach wax dispersed in a silicone liquid. The Fausnight et al. reference utilizes a micronized wax with an emulsifier in order to disperse the wax in a water/organic solvent emulsion containing a silicone liquid in both the organic and aqueous phases for application to a dry surface.

Applicants prior U.S. application Ser. No. 10/314,446 filed on Dec. 9, 2002 and published on Jun. 10, 2004 as Publication No. U.S. 2004-0110850-A1 which has been abandoned teaches the method of application of a different wax composition to a wetted surface and is incorporated by reference in its entirety.

It is known to apply waxes by spraying onto vehicles and applying same to vehicles in tunnel professional car washes and drying the vehicle surface using air; however, the performance is not satisfactory in that the wax does not produce a high gloss finish comparable to that created by the instant composition and method of application.

SUMMARY OF THE INVENTION

A principal object of the present invention is to provide a wax composition for applying to a wet surface in order to eliminate a drying step between the washing and waxing steps. When the composition comprising the instant invention is applied or sprayed onto a wetted surface of a vehicle after washing and/or rinsing, the silicone emulsion separates leaving a silicone fluid (oil) as a separate phase resulting a producing a very high gloss on the exterior surface of the vehicle. The composition is formulated to achieve a product which readily separates in to phases upon application by spraying onto a wetted surface providing a thin film of wax providing the desired coating of the surface.

The instant invention is the first product designed to wax a vehicle as it is dried off after washing or rinsing which utilizes a corrosion resisting agent. A conventional cleaning agent (soap or detergent) can be used to wash the vehicle or the surface of the vehicle can be wetted by rinsing the vehicle with water. Simply spray the wax composition onto the wet vehicle and dry the vehicle with a soft cloth to leave a lustrous shine and protective coating of wax. The instant product eliminates the step of buffing the vehicle after application of wax as required with conventional wax products for the buffing takes place simultaneously with the drying step. There is no extra step required to wax the vehicle. Simply wash, rinse, apply the wax to the wetted surface by spraying, and wipe the vehicle dry. The wax is buffed during the drying step. Moreover, application of the wax prior to drying prevents water spots.

One preferred embodiment of the instant invention is a wax composition containing a dimethyl polysiloxane in water emulsion (containing about 60% dimethyl polysiloxane by weight) in an amount of about 3 percent by weight based on the total weight of the composition, a polymeric emulsifier such as a high molecular weight polyacrylic acid polymer in an amount of about 0.05 percent by weight based on the total weight of the composition, a polyalkylene oxide-modified polydimethylsiloxane block copolymer in an amount of about 0.3 percent by weight based on the total weight of the composition, a humectant such as a propylene glycol in an amount of about 2.0 percent by weight based on the total weight of the composition, a base which forms an emulsifying soap from fatty acids such as a alkyl or aryl amine and more particularly a triethanolamine in an amount of 0.1 percent by weight based on the total weight of the composition, a carnauba wax silicon emulsion in an amount of about 1 percent by weight based on the total weight of the composition, a corrosion inhibitor such as film forming oil soluble blend containing fatty acid amine soaps in an amount of about 0.25 percent by weight based on the total weight of the composition, an organic solvent for example an isoparaffinic solvent in an amount of about 5 percent by weight based on the total weight of the composition, and water (preferably deionized water or equivalent) in an amount of about 88 percent by weight based on the total weight of the composition. Optionally, a preservative such as a broad spectrum bactericide in an amount of about 0.15 percent by weight based on the total weight of the composition and/or a fragrances in an amount of about 0.1 percent by weight of the total weight of the composition can be added to the formulation and/or a colorant in an amount of about 0.1 percent by weight of the total weight of the composition.

A procedure for application of the product composition is as follows: washing a surface with water containing a cleaning agent; rinsing said surface providing a clean wetted surface; spraying the wax composition onto the wetted surface; and wiping treated wet surface with an absorbent material simultaneously drying and buffing the wetted surface producing a high gloss finish.

The instant invention does not require nor utilize a micronized (cryogenically ground) wax nor does it require a low boiling solvent. Of course a micronized wax could be used but it is not required and results in a cost savings. Selected constituents comprising the formulation of Applicant's instant invention are added as emulsified components; however, the formulated product is a blend of components mixed together, and is not dependent upon use of an emulsifier in order to disperse all of the various components together in the final product as is taught by conventional waxes applied to a dry surface.

In keeping with this object there is provided in accordance with the present invention a high water content silicone wax composition for use on vehicular exterior painted metal or painted plastic surface, chrome, stainless steel, plastic moldings, vinyl tops and trim, fiberglass, and/or rubber surfaces. Moreover, the method of applying the same consists of wetting a cleaned surface to be waxed, spraying the wax composition onto the wet surface and wiping the surface with a piece of absorbent material to simultaneously dry and buff the same. Of course, the instant formulation is ready to apply to a vehicle which has just been rinsed after washing.

These an other objects and features of the invention will become apparent to those skilled in the art from the following detailed description and appended claims.

DESCRIPTION OF THE PREFERRED EMBODIMENT

The instant invention is particularly directed to reducing the effort of providing a glossy finish on the painted exterior surface of a vehicle such as an automobile or the like by combining the step of drying, after washing and rinsing, and the step of buffing the wax into a single step operation. To clean the exterior surface of the automobile it is washed in a conventional manner using appropriate conventional cleaning agents such as detergents in the water and the surface is then rinsed using clean water. While still wet from the rinsing the above composition is sprayed lightly onto the surface to be waxed. The waxed surface is then wiped with a cloth, or equivalent absorbent material, to dry the surface and in so doing at the same time the waxed surface is buffed. The conventional step of drying after rinsing and before applying the wax is eliminated.

One preferred embodiment of the instant invention is a wax composition containing a dimethyl polysiloxane in water emulsion (containing about 60% dimethyl polysiloxane by weight) in an amount of about 3 percent by weight based on the total weight of the composition, a polymeric emulsifier such as a high molecular weight polyacrylic acid polymer such as sold under the trade name of PEMULEN from Noveon IP Holdings Corporation in an amount of about 0.05 percent by weight based on the total weight of the composition, a polyalkylene oxide-modified polydimethylsiloxane block copolymer such as sold under the trade name of SILWET L-7608 from OSI Corporation, in an amount of about 0.3 percent by weight based on the total weight of the composition, a humectant such as a propylene glycol in an amount of about 2.0 percent by weight based on the total weight of the composition, a base which forms an emulsifying soap from fatty acids such as a alkyl or aryl amine and more particularly a triethanolamine in an amount of 0.1 percent by weight based on the total weight of the composition, a carnauba wax silicon emulsion such as sold trade name of BURCOSIL CAR from Burlington Chemical in an amount of about 1 percent by weight based on the total weight of the composition, a corrosion inhibitor such as film forming oil soluble blend containing fatty acid amine soaps such as sold under the trade name of LUBEROS by Burlington Chemical Company in an amount of about 0.25 percent by weight based on the total weight of the composition, an organic solvent for example an isoparaffinic solvent such as sold under the trade name of Exxon Mobil Corporation in an amount of about 5 percent by weight based on the total weight of the composition, and water (preferably deionized water or equivalent) in an amount of about 88 percent by weight based on the total weight of the composition. Optionally, a preservative such as a broad spectrum bactericide in an amount of about 0.15 percent by weight based on the total weight of the composition and/or a fragrances in an amount of about 0.1 percent by weight of the total weight of the composition can be added to the formulation and/or a colorant in an amount of about 0.1 percent by weight of the total weight of the composition.

The resulting composition is a white liquid emulsion having a brix of about 2.6, solid contents of about 2.9-3.0 percent. Application to a wet metal, plastic, fiberglass, glass or painted surface to be treated by spraying, results in an easy wiping and removal of excess product from the surface resulting in a glossy surface without streaks.

The above composition is applied to a vehicle by wetting a cleaned surface using clean water. The composition is sprayed lightly onto the wet surface and the surface is then wiped with a cloth, sponge, and/or other absorbent material to dry and simultaneously buff the same. It should be noted that the composition is not added to the rinse water as taught by conventional tunnel type car wash and wax centers or applied to a dry surface.

A silicone in water emulsion comprising a liquid dimethyl polysiloxane is used in the present invention. The dimethyl polysiloxane emulsion is typically obtained commercially in an emulsion which is added to the blend of other constituents and mixed together to form the final wax composition. Dimethyl polysiloxane is sold by Dow Corning under the trademark 346 EMULSION 60% or sold by General Electric under the trademark SM2163 (60%), whereby the preferred ingredient is 60% active dimethyl polysiloxane and 40% water having a viscosity of from about 350 csp to 10,000 csp. A 2004 Material Safety and Data Sheet describes the emulsion as at least 60% polydimethylsiloxane, from 30-60% water and from 3 to 7% alkoxy polyethoxy ethanol calculated as weight percent. A preferred embodiment of the instant invention uses a DOW CORNING 346 EMULSION which is a non-ionic active emulsion based on medium viscosity polydimethysiloxane. It is a polydimethylsiloxane emulsion with added water only and does not contain an organic solvent. An effective amount of the dimethyl polysiloxane 60% of up to 15 percent by weight can be used in the present invention and more particularly in a range of from 0.01 to about 10.0 percent by weight, more particularly in a range of from about 0.1 to about 8.0 percent by weight, and more particularly from about 1.0 to 5.0 percent by weight based on the total weight of the composition. One preferred embodiment uses an effective amount of (dimethyl polysiloxane 60% emulsion) in an amount of 3.0 percent by weight which contains about 1.8 percent of the dimethyl polysiloxane.

A humectant which is hygroscopic provides a stabilizing action to keep the moisture content within a desired range and minimize humidity fluctuations. A preferred humectant contains alcohol groups and is a glycol compound selected from the group including ethylene glycol, diethylene glycol, propylene glycol, methyl alcohol, ethyl alcohol, propyl alcohol, isopropyl alcohol, glycerol, and combinations thereof. The humectant is added in an effective amount to enhance wetting properties of the wax up to 10 percent by weight, more preferably in a range of from between 0.1 to 8.0 percent by weight, more preferably in a range of from 1.0 to 5.0 percent by weight, more preferably in a range of from between 1.0 to 3.0 percent by weight based on the total weight of the 15 composition. One preferred embodiment of the present invention includes about 2 percent by weight of propylene glycol based on the total weight of the composition.

An organic solvent is added to the wax composition to aid in cleansing and aid in the removal of residual water upon application of the product on a wetted surface. Organic solvents useful in the present invention include isoparaffins, aliphatic hydrocarbons, paraffinic solvents, paraffins, synthetic isoparaffinic hydrocarbon. Preferred organic solvents are sold under the trade name of ISOPAR M and ISOPAR V which are synthetically produced isoparaffinic solvents sold by ExxonMobil Chemical Company. A hydrocarbon solvent sold under the brand name of CONOSOL C-200 by Penreco provides acceptable performance as well. It is anticipated that another hydrocarbon solvent sold under the brand name of CALUMET LVP 100 from Calumet Lubricants Co. would be acceptable. The isoparaffinic solvents are highly aliphatic compounds containing a high percentage of isoparaffins. The organic solvents used in the present invention are typically considered high boiling solvents having a low vapor pressure typically less than 1.0 mm Hg at 20° C. and preferably 0.1 mm Hg or less at 20° C. Furthermore, the most preferred ISOPAR solvents reportedly have a vapor pressure of about 10 mm Hg at 38° C. and more preferably have a vapor pressure of about 4 mm Hg at 38° C. The high boiling solvent is added in an effective amount up to 25 percent by weight, more preferably in a range of from between 0.01 to 15.0 percent by weight, more preferably in a range of from 0.5 to 12.0 percent by weight, 0.0.1 to 10.0, more preferably in a range of from 0.5 to 8.0 percent by weight, more preferably in a range of from 1.0 to 6.5 percent by weight, more preferably in a range of from 2.0 to 7.0 percent by weight, more preferably in a range of from 3.5 to 6.5 percent by weight, more preferably in a range of from 4.0 to 6.0 percent by weight, based on the total weight of the composition. One preferred embodiment of the present invention includes about 5.0 percent by weight of ISOPAR M based on the total weight of the composition blend, while alternate embodiment includes ISOPAR M in about 5.0% by weight of the total weight of the composition.

A preferred wax component is natural carnauba wax. Of course, candelilla or ozokerite wax could be utilized in the present invention as well. Moreover, it is contemplated that synthetic waxes such as polyethylene wax, polypropylene wax, polyamide wax, and combinations thereof can also be utilized in the instant invention. The instant invention does not require that the wax be micronized which is a process whereby waxes are cryogenically ground to fine particles of typically less than 20 microns. Conventional commercial wax preparations of greater than 20 microns are adequately dispersed in the present invention. Moreover, the micronization process is considerably more expensive than commercial available waxes processed in the conventional manner.

The wax in the present invention is an anionic or nonionic waterborne carnauba wax or carnauba wax blend emulsion comprising about 5 percent by weight wax and 95 percent by weight of an emulsion consisting of water and an emulsifier (typically silicon glycol or silicone glycol and an alcohol for example isopropanol). A preferred wax composition embodiment contains a carnauba wax silicon emulsion in an amount of from 1.0 to 10.0 percent based on the total weight of the composition, Of course the wax could be obtained dry and dispersed within the blend of components separately from the emulsion providing the same functional qualities; however, it is more convenient to obtain the wax in the form of an emulsion from commercial vendors.

The wax emulsion contains less than 10% wax by weight, and more specifically from about 01.0 to 10.0 percent by weight and more specifically from 2 to 8 percent by weight and more preferably from 3 to 6 percent by weight. It is believed that the carnauba wax blend emulsion used in the formulation and examples of the instant invention contains about 5% by weight camauba wax based on the total weight of the wax emulsion. It is added to the wax composition blend in the form of an emulsion in an effective amount to form a thin film on a wetted surface upon buffing.

The amount of the carnauba wax emulsion in the wax composition preferably ranges from 0.1 to 6.0 percent by weight, and more preferably in a range of from 0.1 to 3.0 percent by weight, and more preferably in a range of from between 0.1 and 2.0 percent by weight and more preferably about 1.0 percent by weight based on the total weight of the composition.

Based on use of 1 percent by weight of a BURCOSIL CAR carnauba emulsion (containing 5% wax) in the wax composition, the actual amount of wax in the composition would be 0.05 percent of wax based on the total weight of the composition.

A polymeric emulsifier or surfactant such as PEMULEN 1622 in an amount of about 0.05 percent by weight is utilized in the preferred embodiment of the present invention. PEMULEN is a trade name of Noveon, Inc. for a oil-in-water emulsifier. PEMULEN is a cross-linked copolymer of acrylic acid and C10-30 alkyl acrylate which is more specifically a high molecular weight copolymer of acrylic acid and a long chain alkyl methacrylate cross-linked with polyalkenyl ethers of polyalcohols.

This particular emulsifier has a triggered release mechanism and is sensitive to ionic strength. Upon application to the exterior of an automobile the hydrophilic portion of the polymer instantly collapses so that the emulsifier instantly de-swells upon contact with the surface characteristics and charge on the automotive body surface releasing the oil phase and providing immediate coverage of the application surface. Thus, upon contact with an ionic surface the cross-linked copolymer of acrylic acid and C10-30 alkyl acrylate collapses allowing the rapid formation of a continuous oil film phase on the application surface and because of the lack of surfactant the film will not easily re-emulsify nor wash off when further exposed to water providing better durability of the wax.

As reported in the Noveon Technical bulletin TDS-117 published in January of 2002, Technical Bulletin TDS-114 published in September of 1999, and Technical Bulletin PDS PEMULEN 1622 published in November of 1999 all of which are incorporated by reference herein, the instant composition utilizes an emulsifier system different from traditional emulsions which have liquid crystals comprised of oil, water and surfactants which inhibit deposition of the oil phase to the application surface. It is reported that the time lag from application to the formation o the continuous oil phase is caused by the slow evaporation of the water phase from the liquid crystal phase starting with the oil in water emulsion with water evaporation to coalesce oil droplets to form liquid crystalline gels depositing on the surface as an occlusive oil layer which takes about 90 minutes according to the information disclosed in the Noveon Technical Bulletin. Whereas the PEMULEN polymeric emulsifier results in an oil in water emulsion with water evaporation to coalesce oil droplets which deposit on the surface as an occlusive oil layer within 1 to 5 minutes omitting the liquid crystalline gels deposition step which may take up to 90 minutes after application. The time lag from application to the formation of the continuous oil phase is caused by the slow evaporation of the water phase from the liquid crystal structures.

Conventional ionic or non-ionic surfactants stabilize oil-in-water emulsions be adsorbing and forming lamellar liquid crystalline layers at the emulsion interface. The hydrophilic-lipophilic balance (HLB) of the oil phase and surfactant must be matched to insure good emulsion stability. Emulsions formed with low levels of PEMULEN water soluble polymer emulsifiers are highly stable because the oil droplets are protected and held in suspension as a result of the high aqueous gel around each oil droplet with the hydrophobic portions of the polymer anchored in the oil phase. The lipophilic portion adsorbs at the oil-water interface and the hydrophilic portion swells in the water forming a gel network around oil droplets providing emulsion stability and does not depend on building liquid crystalline structures to provide emulsion stability.

Moreover, the oil phase in the PEMULEN, acrylates/C10-30 alkyl acrylate cross polymer emulsion spreads rapidly and are water proof in that they cannot re-wet. In conventional emulsions, upon final evaporation of the oil phase, the oil layer contains high concentrations of surfactants rendering the oil phase readily re-emulsifiable.

The instant composition utilizes the acrylates/C10-30 alkyl acrylate cross polymer in an amount up to 5.0 percent by weight, and more preferably from 0.001 to 2.0 percent by weight, and more preferably from 0.01 to 0.1 percent by weight, and more preferably at an amount of about 0.05 percent by weight based on the total weight of the composition.

A corrosion inhibitor which may be a film forming agent, such as LUBEROS RP-3118 is utilized in at least one preferred embodiment to aid in protecting the paint from corrosive elements, such as rust, road salt, acid rain, and bird droppings. LUBEROS RP-3118 is designed for use in oil based products, semi-synthetics and emulsion systems. It is a balanced blend of fatty acid amine soaps and other components. The fatty acid amine soaps are the active ingredients. It is an oil soluble formulated blend for use in formulating oil and/or solvent based rust preventives, and forms protective non-staining coating for short term use imparting rust preventive properties to formulation and can be used with a low viscosity oil/solvent together with water insoluble lubricant additives such as esters, oleates, and waxes. It is oil soluble and contains 15-20% by weight nap oil (100-200 sus), 5-10 weight percent water insoluble additives, and the balance is mineral spirits. It can be obtained from Burlington Chemical Co., Inc. In Burlington, N.C. The amount of corrosion inhibitor used in the polishing product is about 0.0001 wt. % to about 3 wt. %, and more preferably from about 0.001 wt. % to 2.0 wt. %, and more preferably from about 0.01 to 1.0 wt. %, and more preferably from about 0.1 to 0.5 wt percent based o the total eight of the polishing composition. The preferred embodiment described in the example contains about 0.25 wt. % based on the total weight percent of the composition.

The wax composition of the preferred embodiment includes a silicone surfactant, such as SILWET 7607 or 7608, a polyalkylene oxide-modified polydimethylsiloxane block copolymer, product commercially available from OSI Industries. They are similar to standard silicone fluids except the polydimethylsiloxane backbone has polyalkylene oxide side chains similar to non-ionic surfactants such as poly (oxyethylene) poly (oxypropylene) block copolymers known as pluronic polyols. The side chains are terminated with hydroxy or low alkoxy end groups. Thus, its main components are silicone, ethylene oxide and propylene oxide. The silicone surfactant is used as a surface-active agent in an effective amount to reduce the interfacial tension between the treated waxed surface and water. Unmodified silicone is not water soluble. Its bulk surface tension is very low about 20 mN/m. The SILWET silicone surfactants used in the instant invention are designed to be soluble yet similar in structure to unmodified silicone by manipulating molecular structure, size and low solubility via the design of a trisiloxane backbone. The selection of a silicone with a high refractive index increases the gloss, and the amount of the silicone surfactant is important in order to obtain a controlled low evaporation rate to the residual water from the treated surface. Silicone refracts light on a surface but won't evaporate like water and because of its low surface tension the silicone surfactant aids in spreading and sheeting of the wax formulation leaving a thin even coating on the surface.

The silicone surfactant composition is added in an effective amount ranging of from 0.01 to 5.0 percent by weight, and more preferably in a range of from 0.1 to 2.0 percent by weight, and more preferably in a range of from between 0.1 to 0.5 percent by weight based on the total weight of the composition. One preferred embodiment uses 0.30 percent by weight of a polyalkylene oxide-modified polydimethylsiloxane block copolymer in the blended composition.

The instant wax composition utilizes a base which forms emulsifying soap from fatty acids such as a alkyl or aryl amine and more particularly a triethanolamine. One preferred wax composition embodiment of the instant invention utilizes triethanolamine (TEA) in an amount of about 0.1 percent by weight. Other bases which form satisfactory emulsifying soaps with fatty acids may be substituted for triethanolamine. Caustic soda and caustic potash have been used with fair success. Triethanolamine oleate emulsifier in the corrosion inhibitor is preferably triethanolamine. The organic amine is preferably diethanolamine. The emulsifying agent is preferably glycerine monostearate. There are three ethanolamines, namely, monoethanolamine, diethanolamine, and triethanolamine, and while the instant invention contemplates the use of other alkyl amines or aryl amines, the preferred composition uses triethanolamine which is a mixture of all three of the ethanolamines, all of which are quite similar and have the same characteristics. Typically, the commercial grade contains approximately seventy-five to eighty percent triethanolamine, twenty to twenty-five percent diethanolamine and naught to five percent monoethanolamine. The commercial triethanolamine combines with the fatty acid to form a soap which in the case of stearic acid produces a substantially transparent solid soap soluble in organic liquids.

Since the triethanolamine combines with the fatty acid in molecular proportions, the exact quantities of the acid and the base are unimportant. The triethanolamine composition is added in an effective amount ranging of from 0.01 to 5.0 percent by weight, and more preferably in a range of from 0.1 to 2.0 percent by weight, and more preferably in a range of from between 0.1 to 0.5 percent by weight based on the total weight of the composition. One preferred embodiment uses 0.30 percent by weight of a polyalkylene oxide-modified polydimethylsiloxane block copolymer in the blended composition.

A biocide, such as DANTOGARD (DMDM Hydantoin) or TROYSAN 395 is optionally used as a preservative in the product. The biocide is not a necessary component to provide a functional wax composition for use on wetted surfaces; however, the preservative provides a useful shelf life to the product. The biocide preservative is added in an effective amount to preserve the wax composition product and ranges from 0.01 to 2.0 percent by weight, and more preferably in a range of from 0.05 to 1.0 percent by weight, and more preferably in a range of from between 0.1 and 0.5 percent by weight based on the total weight of the composition. One preferred embodiment uses 0.12 percent by weight of a DANTOGARD in the wax composition.

A major amount of water is added to the wax composition blend of the instant invention as a carrier. Preferably the water is soft or demineralized and is present in an amount of up to 96 percent by weight, and more preferably of from between 75 to 95 percent by weight, and more preferably of from between 85 to 92 percent by weight. One preferred embodiment contains about 88 percent by weight water based on the total weight percent of the composition.

Although not required, an effective amount of one or more fragrances, such as vanilla, bubble gum, orange, limonene, and the like may be added to the instant invention to impart a desirable scent to the product. Preferably the fragrance is present in an amount of up to 2 percent by weight, and more preferably of from between 0.001 to 1.0 percent by weight, and more preferably of from between 0.01 to 0.5 percent by weight. One preferred embodiment contains about 0.06 percent by weight of bubble gum flavor and about 0.1 percent by weight of vanilla fragrance based on the total weight percent of the composition.

One preferred formula for the wax composition of the present invention is set forth in Table I and II as follows, wherein the biocide and fragrance are optional components:

TABLE I

| Constituent | Commercial Name | Percent by Weight |
|---|---|---|
| Water | | 88.05 |
| Polymeric emulsifier | PEMULEN 1622 | 0.050 |
| Silicone Surfactant | SILWET 7607 | 0.30 |
| Humectant | Propylene Glycol | 2.00 |
| Dimethyl polysiloxane 60% | DC 346 | 3.00 |
| Isoparaffinic hydrocarbon | ISOPAR M | 5.00 |
| TEA triethanolamine in an amount of about 0.1 percent by weight; | | 1.00 |
| carnauba emulsion | BURCOSIL CAR (% wt of wax emulsion) | 1.00 |
| Corrosion Inhibitor | LUBEROS RP-3118 | 0.25 |
| AA057359 | Fragrance | 0.100 |
| Biocide | DANTOGARD | 0.15 |

TABLE II

| Constituent | Commercial Name | Percent by Weight |
|---|---|---|
| Water | | 88.05 |
| Polymeric emulsifier | PEMULEN 1622 | 0.050 |
| Silicone Surfactant | SILWET 7607 | 0.30 |
| Humectant | (Propylene Glycol) | 2.00 |
| Dimethyl polysiloxane 60% | DC 346 | 3.00 |
| Isoparaffinic hydrocarbon | ISOPAR M or LPA-210 or CONASOL C-200 | 5.00 |
| TEA triethanolamine in an amount of about 0.1 percent by weight | | 1.00 |
| carnauba emulsion | BURCOSIL CAR (% wt of wax emulsion) | 1.00 |
| Corrosion Inhibitor | LUBEROS RP-3118 | 0.25 |
| AA057359 | Fragrance | 0.100 |
| Biocide | DANTOGARD | 0.15 |

Other compatible dyes, fungicides, and/or colorants may also be added to the wax composition in an effective amounts of less than 1 percent by weight based on the total weight of the composition.

A preferred embodiment of the instant invention is a wax composition comprising a dimethyl polysiloxane in water emulsion in an amount of from 0.01 to 10.0 percent by weight based on the total weight of the composition, a humectant glycol compound in an amount of from 0.1 to 8.0 percent by weight based on the total weight of the composition, an organic isoparaffinic solvent in an amount of from 0.01 to 15.0 percent by weight based on the total weight of the composition, a carnauba wax silicon emulsion containing from 1 to 10 percent wax and from 91 to 99 percent emulsion based on the total weight of the composition, a polymeric emulsifier comprising a cross-linked copolymer of acrylic acid and C10-30 alkyl acrylate in an amount of from 0.001 to 2.0 percent by weight based on the total weight of the composition, a corrosion inhibitor in an amount of from 0.0001 to 3.0 weight percent by weight based on the total weight of the composition, a polyalkylene oxide-modified polydimethylsiloxane block copolymer in an amount of from 0.01 to 5.0 percent by weight based on the total weight of the composition, a triethanolamine in an amount of from 0.01 to 5.0 percent by weight based on the total weight of the composition, and the remainder of the composition being water (preferably deionized water or equivalent). Optionally, a preservative such as a broad spectrum bactericide in an amount of from 0.01 to 2.0 percent by weight based on the total weight of the composition and/or a fragrances in an amount of from 0.01 to 2.0 percent by weight of the total weight of the composition can be added to the formulation and/or a colorant in an amount of 0.01 to 2.0 percent by weight of the total weight of the composition.

A preferred embodiment of the instant invention is a wax composition consisting essentially of a dimethyl polysiloxane in water emulsion in an amount of from 0.01 to 10.0 percent by weight based on the total weight of the composition, a humectant glycol compound in an amount of from 0.1 to 8.0 percent by weight based on the total weight of the composition, an organic isoparaffinic solvent in an amount of from 0.01 to 15.0 percent by weight based on the total weight of the composition, a carnauba wax silicon emulsion containing from 1 to 10 percent wax and from 91 to 99 percent emulsion based on the total weight of the composition, a polymeric emulsifier comprising a cross-linked copolymer of acrylic acid and C10-30 alkyl acrylate in an amount of from 0.001 to 2.0 percent by weight based on the total weight of the composition, a corrosion inhibitor in an amount of from 0.0001 to 3.0 weight percent by weight based on the total weight of the composition, a polyalkylene oxide-modified polydimethylsiloxane block copolymer in an amount of from 0.01 to 5.0 percent by weight based on the total weight of the composition, a triethanolamine in an amount of from 0.01 to 5.0 percent by weight based on the total weight of the composition, and and the remainder of the composition being water (preferably deionized water or equivalent). Optionally, a preservative such as a broad spectrum bactericide in an amount of from 0.01 to 2.0 percent by weight based on the total weight of the composition and/or a fragrances in an amount of from 0.01 to 2.0 percent by weight of the total weight of the composition can be added to the formulation and/or a colorant in an amount of 0.01 to 2.0 percent by weight of the total weight of the composition.

A preferred embodiment of the instant invention is a wax composition consisting of a dimethyl polysiloxane in water emulsion in an amount of from 0.01 to 10.0 percent by weight based on the total weight of the composition, a humectant glycol compound in an amount of from 0.1 to 8.0 percent by weight based on the total weight of the composition, an organic isoparaffinic solvent in an amount of from 0.01 to 15.0 percent by weight based on the total weight of the composition, a carnauba wax silicon emulsion containing from 1 to 10 percent wax and from 91 to 99 percent emulsion based on the total weight of the composition, a polymeric emulsifier comprising a cross-linked copolymer of acrylic acid and C10-30 alkyl acrylate in an amount of from 0.001 to 2.0 percent by weight based on the total weight of the composition, a corrosion inhibitor in an amount of from 0.0001 to 3.0 weight percent by weight based on the total weight of the composition, a polyalkylene oxide-modified polydimethylsiloxane block copolymer in an amount of from 0.01 to 5.0 percent by weight based on the total weight of the composition, a triethanolamine in an amount of from 0.01 to 5.0 percent by weight based on the total weight of the composition, and and the remainder of the composition being water (preferably deionized water or equivalent). Optionally, a preservative such as a broad spectrum bactericide in an amount of from 0.01 to 2.0 percent by weight based on the total weight of the composition and/or a fragrances in an amount of from 0.01 to 2.0 percent by weight of the total weight of the composition can be added to the formulation and/or a colorant in an amount of 0.01 to 2.0 percent by weight of the total weight of the composition.

Another preferred embodiment of the instant invention is a wax composition consisting essentially of a dimethyl polysiloxane in water emulsion in an amount of from 0.01 to 10.0 percent by weight based on the total weight of the composition, a humectant glycol compound in an amount of from 0.1 to 8.0 percent by weight based on the total weight of the composition, an organic isoparaffinic solvent in an amount of from 0.01 to 15.0 percent by weight based on the total weight of the composition, a carnauba wax silicon emulsion containing from 1 to 10 percent wax and from 91 to 99 percent emulsion based on the total weight of the composition, a polymeric emulsifier comprising a cross-linked copolymer of acrylic acid and C10-30 alkyl acrylate in an amount of from 0.001 to 2.0 percent by weight based on the total weight of the composition, a corrosion inhibitor in an amount of from 0.0001 to 3.0 weight percent by weight based on the total weight of the composition, a polyalkylene oxide-modified polydimethylsiloxane block copolymer in an amount of from 0.01 to 5.0 percent by weight based on the total weight of the composition, atriethanolamine in an amount of from 0.01 to 5.0 percent by weight based on the total weight of the composition, and and the remainder of the composition being water (preferably deionized water or equivalent). Optionally, a preservative such as a broad spectrum bactericide in an amount of from 0.01 to 2.0 percent by weight based on the total weight of the composition and/or a fragrances in an amount of from 0.01 to 2.0 percent by weight of the total weight of the composition can be added to the formulation and/or a colorant in an amount of 0.01 to 2.0 percent by weight of the total weight of the composition.

Finally, another preferred embodiment of the instant invention is a wax composition consisting essentially of a dimethyl polysiloxane in water emulsion in an amount of from 0.01 to 10.0 percent by weight based on the total weight of the composition, a humectant glycol compound in an amount of from 0.1 to 8.0 percent by weight based on the total weight of the composition, an organic isoparaffinic solvent in an amount of from 0.01 to 15.0 percent by weight based on the total weight of the composition, a carnauba wax silicon emulsion containing from 1 to 10 percent wax and from 91 to 99 percent emulsion based on the total weight of the composition, a polymeric emulsifier comprising a cross-linked copolymer of acrylic acid and C10-30 alkyl acrylate in an amount of from 0.001 to 2.0 percent by weight based on the total weight of the composition, a corrosion inhibitor in an amount of from 0.0001 to 3.0 weight percent by weight based on the total weight of the composition, a polyalkylene oxide-modified polydimethylsiloxane block copolymer in an amount of from 0.01 to 5.0 percent by weight based on the total weight of the composition, a triethanolamine in an amount of from 0.01 to 5.0 percent by weight based on the total weight of the composition, and and the remainder of the composition being water (preferably deionized water or equivalent). Optionally, a preservative such as a broad spectrum bactericide in an amount of from 0.01 to 2.0 percent by weight based on the total weight of the composition and/or a fragrances in an amount of from 0.01 to 2.0 percent by weight of the total weight of the composition can be added to the formulation and/or a colorant in an amount of 0.01 to 2.0 percent by weight of the total weight of the composition.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented herein above. Rather, what is intended to be covered is within the spirit and scope of the appended claims.

We claim:

1. A wax composition for application to a wet surface, comprising:
   a dimethyl polysiloxane in water emulsion in an amount of from 0.01 to 10.0 percent by weight based on the total weight of the composition;
   a humectant glycol compound in an amount of from 0.1 to 8.0 percent by weight based on the total weight of the composition;
   an organic isoparaffinic solvent in an amount of from 0.01 to 15.0 percent by weight based on the total weight of the composition;
   a wax silicon emulsion in an amount of from 1 to 10% by weight based on the total weight of the composition, said emulsion containing from 1 to 10 percent wax;

a polymeric emulsifier comprising a cross-linked copolymer of acrylic acid and C10-30 alkyl acrylate in an amount of from 0.001 to 2.0 percent by weight based on the total weight of the composition;

a corrosion inhibitor in an amount of from 0.0001 to 3.0 weight percent by weight based on the total weight of the composition;

a polyalkylene oxide-modified polydimethylsiloxane block copolymer in an amount of from 0.01 to 5.0 percent by weight based on the total weight of the composition;

a triethanolamine in an amount of from 0.01 to 5.0 percent by weight based on the total weight of the composition; and the remainder of the composition being water.

2. The wax composition of claim 1, further comprising a broad spectrum bactericide in an amount of from 0.01 to 2.0 percent by weight based on the total weight of the composition.

3. The wax composition of claim 1, further comprising a fragrance in an amount of from 0.01 to 2.0 percent by weight of the total weight of the composition.

4. The wax composition of claim 1, further comprising a colorant in an amount of 0.01 to 2.0 percent by weight of the total weight of the composition.

5. The wax composition of claim 1, including a fragrance in an amount of about 0.15 percent by weight.

6. A method of waxing a surface comprising the steps of:
a) washing a surface with water containing a cleaning agent;
b) rinsing said surface providing a clean wetted surface;
c) spraying the composition of claim 1 onto said wetted surface; and
d) wiping said wet surface with an absorbent material simultaneously drying and buffing said wetted surface producing a waxed surface.

7. The method of claim 6, wherein said surface comprises the painted surface of a vehicle.

8. The method of claim 6, wherein said step of providing a clean surface to be waxed includes washing said surface with water containing a conventional suitable cleaning agent and rinsing said washed surface with clean water to thereby provide said clean wetted surface to be waxed.

9. A wax composition for application to a wet surface, consisting essentially of:
a dimethyl polysiloxane in water emulsion in an amount of from 0.01 to 10.0 percent by weight based on the total weight of the composition;

a humectant glycol compound in an amount of from 0.1 to 8.0 percent by weight based on the total weight of the composition;

an organic isoparaffinic solvent in an amount of from 0.01 to 15.0 percent by weight based on the total weight of the composition;

a wax silicon emulsion in an amount of from 1 to 10% by weight based on the total weight of the composition, said emulsion containing from 1 to 10 percent wax;

a polymeric emulsifier comprising a cross-linked copolymer of acrylic acid and C10-30 alkyl acrylate in an amount of from 0.001 to 2.0 percent by weight based on the total weight of the composition;

a corrosion inhibitor in an amount of from 0.0001 to 3.0 weight percent by weight based on the total weight of the composition;

a silicone surfactant in an amount of from 0.01 to 5.0 percent by weight based on the total weight of the composition;

a triethanolamine in an amount of from 0.01 to 5.0 percent by weight based on the total weight of the composition; and the remainder of the composition being water.

10. The wax composition of claim 9, wherein said silicone surfactant comprises a polyalkylene oxide-modified polydimethylsiloxane block copolymer.

11. The wax composition of claim 9 including an effective amount of a biocide.

12. The wax composition of claim 11, wherein said effective amount of a biocide is from about 0.01 to 1.0 percent by weight.

13. The wax composition of claim 9 including a fragrance.

14. The wax composition of claim 13, wherein said fragrance is present in an amount of from between 0.001 and 1.0 percent by weight.

* * * * *